US012669641B2

(12) United States Patent
Muramatsu et al.

(10) Patent No.: US 12,669,641 B2
(45) Date of Patent: Jun. 30, 2026

(54) ILLUMINATION DEVICE

(71) Applicant: TOYODA GOSEI CO., LTD., Kiyosu (JP)

(72) Inventors: Kazuma Muramatsu, Aichi-ken (JP); Akitoshi Naganawa, Aichi-ken (JP); Itsuhiko Hirota, Aichi-ken (JP)

(73) Assignee: TOYODA GOSEI CO., LTD., Aichi-pref (JP)

( * ) Notice: Subject to any disclaimer, the term of this patent is extended or adjusted under 35 U.S.C. 154(b) by 0 days.

(21) Appl. No.: 18/959,784

(22) Filed: Nov. 26, 2024

(65) Prior Publication Data

US 2025/0180800 A1     Jun. 5, 2025

(30) Foreign Application Priority Data

Dec. 1, 2023    (JP) ................................. 2023-203705

(51) Int. Cl.
| | |
|---|---|
| *F21V 8/00* | (2006.01) |
| *B60Q 3/283* | (2017.01) |
| *B60Q 3/62* | (2017.01) |
| *B60Q 3/64* | (2017.01) |
| *B60Q 3/66* | (2017.01) |
| *B60R 11/00* | (2006.01) |
| *F21V 17/12* | (2006.01) |
| *F21V 17/16* | (2006.01) |
| *F21Y 105/18* | (2016.01) |

(52) U.S. Cl.
CPC .......... *G02B 6/0091* (2013.01); *B60Q 3/283* (2017.02); *B60Q 3/62* (2017.02); *B60Q 3/66* (2017.02); *B60Q 3/64* (2017.02); *B60R*

*2011/001* (2013.01); *F21V 17/12* (2013.01); *F21V 17/16* (2013.01); *F21V 17/164* (2013.01); *F21Y 2105/18* (2016.08); *G02B 6/001* (2013.01)

(58) Field of Classification Search
CPC . B60Q 3/283; B60Q 3/62; B60Q 3/64; B60Q 3/66; F21V 17/12; F21V 17/16; F21V 17/164; G02B 6/001; F21Y 2105/18; B60R 2011/001
See application file for complete search history.

(56) References Cited

U.S. PATENT DOCUMENTS

| | | | | |
|---|---|---|---|---|
| 11,198,387 | B1 * | 12/2021 | Matsu | ................... F21V 23/005 |
| 2016/0025281 | A1 * | 1/2016 | Gardner | ................... B62D 1/06 |
| | | | | 362/520 |

(Continued)

FOREIGN PATENT DOCUMENTS

WO       2022/157129 A1    7/2022

*Primary Examiner* — Colin J Cattanach
(74) *Attorney, Agent, or Firm* — Posz Law Group, PLC

(57) ABSTRACT

An illumination device is to be provided in a steering wheel. The illumination device includes a substrate provided with a light emitting element on a surface of the substrate, a cover member that forms a part of an outer surface of the steering wheel and has light transmission of emitting visible light output from the light emitting element to an outside of the steering wheel, a light guiding member configured to guide the visible light output from the light emitting element to the cover member, and a base member to which the substrate and the cover member are attached and which holds the substrate and the cover member. The light guiding member is held by being sandwiched between the substrate and the base member.

8 Claims, 10 Drawing Sheets

(56)    References Cited

U.S. PATENT DOCUMENTS

| 2024/0067083 | A1* | 2/2024 | Bertrand | .................. | B60Q 3/78 |
| 2024/0190339 | A1* | 6/2024 | Kim | ......................... | B62D 1/06 |
| 2024/0391381 | A1* | 11/2024 | Bertrand | ............... | B62D 1/046 |
| 2024/0424985 | A1* | 12/2024 | Nikolauk | ................. | B62D 1/06 |

* cited by examiner

UPWARD DIRECTION

LEFT DIRECTION

REAR DIRECTION

RIGHT DIRECTION

DOWNWARD DIRECTION

Figure 10:
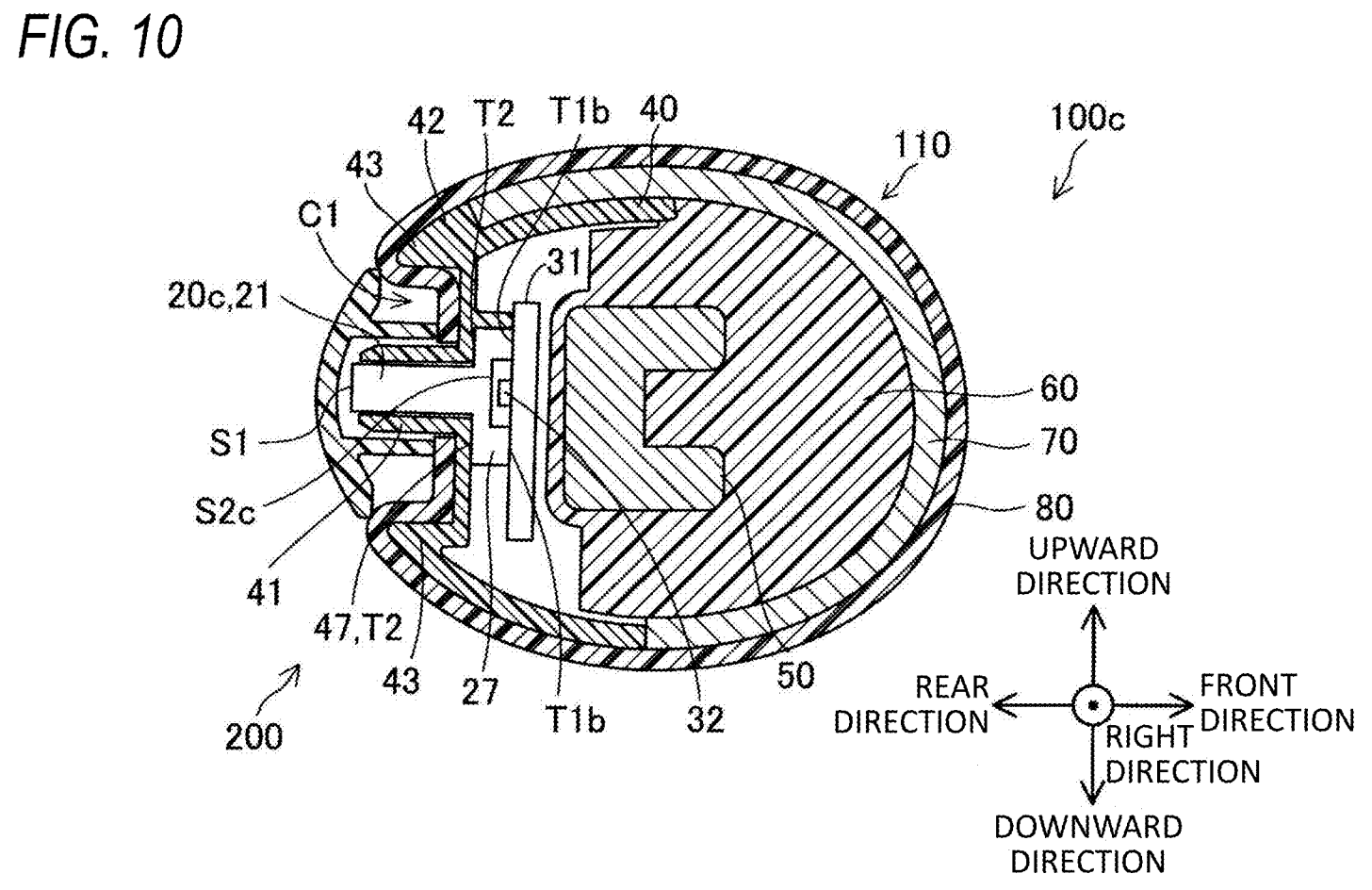

UPWARD
DIRECTION

FRONT
DIRECTION

REAR
DIRECTION

RIGHT
DIRECTION

DOWNWARD
DIRECTION

200

ILLUMINATION DEVICE

CROSS-REFERENCE TO RELATED APPLICATIONS

This application is based on and claims priority under 35 USC 119 from Japanese Patent Application No. 2023-203705 filed on Dec. 1, 2023, the entire content of which is incorporated herein by reference.

TECHNICAL FIELD

The present disclosure relates to an illumination device to be provided in a steering wheel.

BACKGROUND ART

It has been proposed to attach a device (hereinafter, referred to as an "illumination device") that emits light such as visible light and infrared light to a steering wheel at a position viewable to a driver and use the device. For example, WO2022/157129A1 discloses an illumination device including a substrate provided with a light source, a diffuser extending along a rim and constituting an outer wall from which light is emitted, and a light guiding member guiding light emitted from the light source to the diffuser. In the illumination device, a relative positional relation between the light guiding member and the diffuser is fixed by engaging the light guiding member with the diffuser.

However, in the illumination device according to WO2022/157129A1, since a relative positional relation between the light source and the light guiding member is not fixed, the positional relation may be deviated. For example, when FIG. 2 and FIG. 3 according to WO2022/157129A1 are compared with each other, in the configuration of FIG. 3, the light guiding member is shifted upward with respect to the light source compared to the configuration of FIG. 2. When the relative positional relation between the light source and the light guiding member is deviated as described above, a problem that a luminance at a light emitting surface of the illumination device is deviated from a predetermined luminance or a problem that luminance unevenness occurs at the light emitting surface may occur. A technology capable of restraining a deviation in a relative positional relation between a light source and a light guiding member is desired for the illumination device to be provided in the steering wheel.

SUMMARY OF INVENTION

The present disclosure has been made to solve at least a part of the above problems, and can be implemented in the following aspect.

(1) An aspect of non-limiting embodiments of the present disclosure relates to an illumination device to be provided in a steering wheel, including:

a substrate provided with a light emitting element on a surface of the substrate;

a cover member that forms a part of an outer surface of the steering wheel and has light transmission of emitting visible light output from the light emitting element to an outside of the steering wheel;

a light guiding member configured to guide the visible light output from the light emitting element to the cover member; and a base member to which the substrate and the cover member are attached and which holds the substrate and the cover member, in which the light guiding member is held by being sandwiched between the substrate and the base member.

According to the illumination device of the aspect, since the light guiding member is held by being sandwiched between the substrate and the base member, it is possible to restrain a deviation of a relative positional relation between the light guiding member and the light emitting element serving as a light source provided on the surface of the substrate. In addition, since the deviation of the relative positional relation between the light source and the light guiding member can be restrained as described above, for example, it is not necessary to prevent positional misalignment by providing an engaging portion such as a claw or an engaging hole on an outer peripheral surface of the light guiding member and engaging the engaging portion with the base member or the cover member. Therefore, it is possible to restrain a decrease in the amount of light due to, for example, leakage of the visible light to the outside in the engaging portion provided in the light guiding member.

(2) In the illumination device of the aspect, the substrate is attached to the base member by screwing, and the light guiding member is held by the substrate and the base member due to the screwing.

According to the illumination device of the aspect, since the light guiding member is held by the substrate and the base member due to the screwing, as compared with a configuration without the screwing, the holding of the light guiding member by the substrate and the base member can be more reliably achieved, and such a holding state can be maintained for a longer time.

(3) In the illumination device of the aspect, the light guiding member includes:

a first light guiding portion having an emission surface through which the visible light is emitted from the light guiding member to the cover member, and configured to extend along a first direction from the surface of the substrate toward the cover member;

a second light guiding portion having an incident surface on which the visible light output from the light emitting element is incident, and configured to extend along a second direction intersecting the first direction; and a deflection portion connecting the first light guiding portion and the second light guiding portion, and configured to deflect the visible light derived from the second light guiding portion to be input to the first light guiding portion.

According to the illumination device of the aspect, since the light guiding member includes the first light guiding portion, the second light guiding portion, and the deflection portion, as compared with a configuration including only the first light guiding portion or only the second light guiding portion, a light path length of the light guiding member can be increased, and thus the light can be more easily diffused. In addition, as compared with a configuration in which the second light guiding portion is omitted and the length of the first light guiding portion is extended or a configuration in which the first light guiding portion is omitted and the length of the second light guiding portion is extended, an excessive increase in the length of the light guiding member in a specific direction can be restrained, and the size of the illumination device can be reduced.

(4) In the illumination device of the aspect, the light guiding member includes a first light guiding portion having an emission surface through which the visible light is emitted from the light guiding member to the cover member, and configured to extend along a first direction from the surface of the substrate toward the cover member, and the base member includes a support portion surrounding at least a part of a side surface of the first light guiding portion over an entire periphery of the first light guiding portion.

According to the illumination device of the aspect, since the base member includes the support portion that surrounds at least a part of the side surface of the first light guiding portion over the entire periphery of the first light guiding portion, an excessive positional misalignment of the first light guiding portion can be restrained.

(5) In the illumination device of the aspect, a first contact portion of the substrate and a second contact portion of the base member are disposed at positions overlapping each other as viewed in a direction from the surface of the substrate toward the cover member, the first contact portion coming into contact with the light guiding member to sandwich the light guiding member with the base member, and the second contact portion coming into contact with the light guiding member to sandwich the light guiding member with the substrate.

According to the illumination device of the aspect, since the first contact portion and the second contact portion are disposed at the positions overlapping each other as viewed in the direction from the surface of the substrate toward the cover member, a positional misalignment of the substrate in the direction from the surface of the substrate toward the cover member can be more reliably restrained. Therefore, the deviation of the relative positional relation between the light emitting element as the light source and the light guiding member can be more reliably restrained.

BRIEF DESCRIPTION OF DRAWINGS

Exemplary embodiment(s) of the present invention will be described in detail based on the following figures, wherein:

FIG. 7 is a sectional view showing a cross section of a steering wheel according to a second embodiment;

FIG. 10 is a sectional view showing a cross section of a steering wheel according to a fourth embodiment.

DESCRIPTION OF EMBODIMENTS

A. First Embodiment

A1: Overall Configuration of Steering Wheel 100

Figure 1:
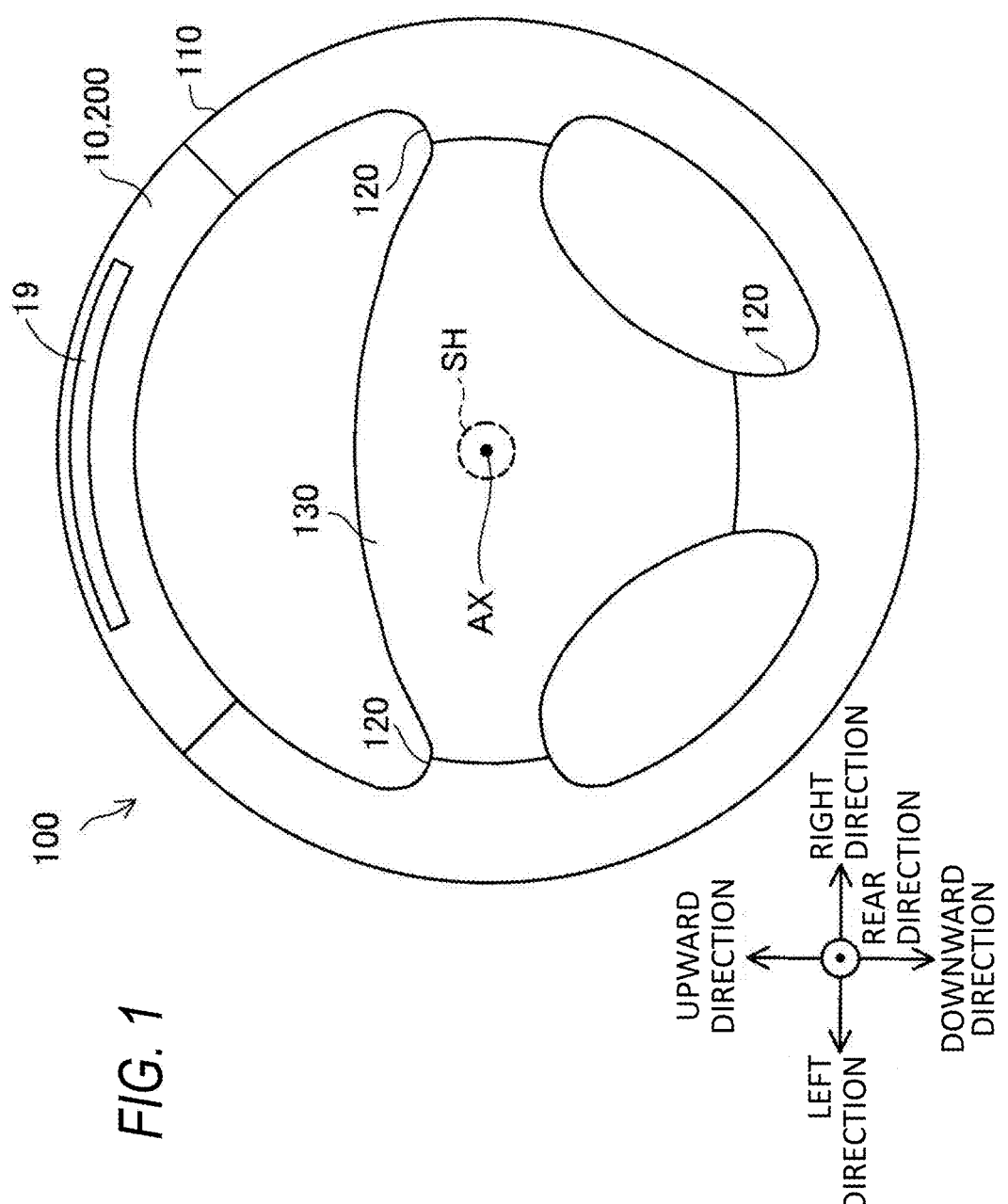
FIG. 1 is a plan view showing an external shape of a steering wheel in a state in which an illumination device as an embodiment of the present disclosure is attached.

FIG. 1 is a plan view showing an external shape of a steering wheel 100 in a state in which an illumination device 200 as an embodiment of the present disclosure is attached. The steering wheel 100 is disposed in a driver's seat area of a vehicle and is used by a driver. Examples of the vehicle include a vehicle equipped with an engine, a hybrid vehicle (HEV), a plug-in hybrid vehicle (PHEV), a battery electric vehicle (BEV), and a fuel cell vehicle (FCV). The steering wheel 100 is a part of a steering device operated by a driver of the vehicle. FIG. 1 shows the steering wheel 100 in a state of being coupled to a steering shaft SH in the vehicle and causing the vehicle to travel straight (hereinafter, also referred to as a "reference state"). FIG. 1 shows an external configuration of the steering wheel 100 on a side facing the driver (a "rear" side to be described later). The steering wheel 100 is configured to enable a rotation operation about an axis AX of the steering shaft SH. The rotation of the steering wheel 100 is transmitted to a steering gear box (not shown) via the steering shaft SH.

In the present embodiment, a direction along the axis AX of the steering shaft SH is referred to as a "front-rear direction" (a front direction and a rear direction) in association with a traveling direction of the vehicle. Among directions orthogonal to the axis AX, a direction overlapping with a vertical direction (a vertically upward direction and a vertically downward direction) when viewed by the driver is referred to as an "upward-downward direction". Among the directions orthogonal to the axis AX, a direction parallel to left and right directions (a width direction) of the vehicle is referred to as a "left-right direction".

The steering wheel 100 includes a ring-shaped grip portion 110, a boss portion 130 disposed at a substantially central portion of the grip portion 110, three spoke portions 120, and the illumination device 200 disposed at a part of the grip portion 110.

The grip portion 110 is gripped by the driver when the steering wheel 100 is operated. In the present embodiment, the grip portion 110 has a substantially circular ring shape. A center axis of the grip portion 110 coincides with the axis AX of the steering shaft SH. The shape of the grip portion 110 may be any shape such as a polygonal shape and an elliptical shape instead of the substantially circular ring shape, and may be a non-symmetrical shape such as a so-called D shape. Further, the shape of the grip portion 110 is not limited to an annular shape, and may be any shape formed by a plurality of parts provided at positions separated from each other. As described below, the grip portion 110 is configured by stacking a plurality of members in a thickness direction. The outermost layer is formed by an outer skin layer (an outer skin layer 80 to be described later) formed of a leather member. Although not shown in FIG. 1, in the grip portion 110, a recess (a recess C1 to be described later) that accommodates a part of the illumination device 200 is formed in a part of the grip portion 110 on the upper side in the reference state. The part of the illumination device 200 is accommodated in the recess C1. In other words, the illumination device 200 is fitted into the recess C1. Further, an opening of the recess C1 is closed by the illumination device 200.

The three spoke portions 120 couple the grip portion 110 and the boss portion 130. The boss portion 130 corresponds to a connection portion when the steering wheel 100 is connected to the steering shaft SH. A folded air bag and an inflator, which are not shown, are accommodated in the boss portion 130. Further, a temperature control circuit constituting a heater, and various sensor devices for detecting room temperature and gripping of the grip portion 110 by a user may be accommodated in the boss portion 130. The three spoke portions 120 and the boss portion 130 may be provided with various operation buttons for operating a navigation device, an audio device, and the like mounted on the vehicle.

The illumination device 200 emit light. In the present embodiment, the light emitted by the illumination device 200 includes visible light and infrared light (infrared ray). By emitting the visible light from the illumination device 200, the driver can be notified of various information. For example, by emitting lights of various colors or blinking light, the driver can be notified of some information. Specifically, it is possible to prompt the driver to grip the steering wheel by emitting red light. In addition, by emitting the infrared light from the illumination device 200, a part of the body of the driver can be clearly photographed by an infrared camera in a dark interior cabin at night.

Figure 2:
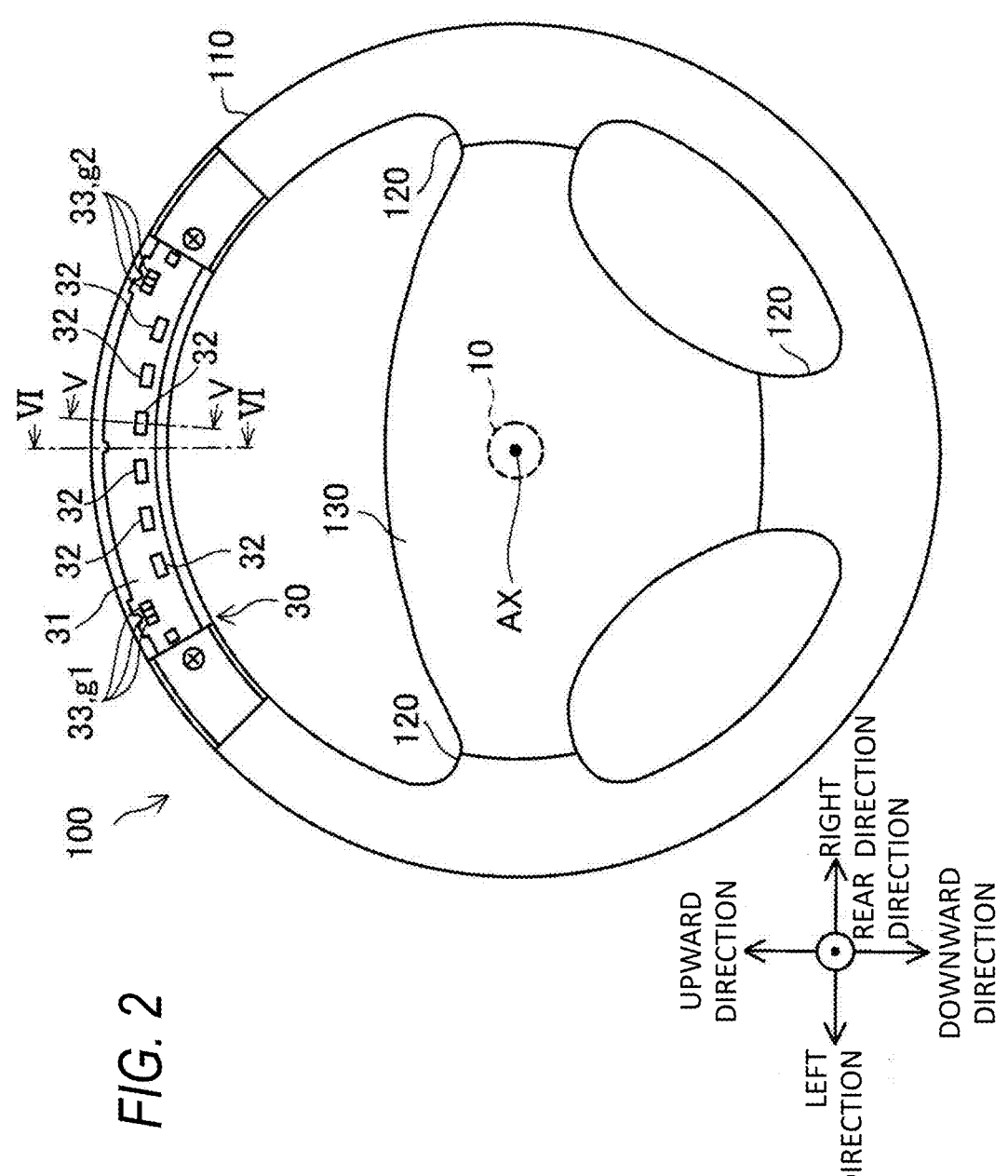
FIG. 2 is a plan view showing an external shape of the steering wheel in a state in which a cover member, a light guiding member, and a base member are removed.

FIG. 2 is a plan view showing an external shape of the steering wheel 100 in a state in which a cover member 10, a light guiding member 20, and a base member 40 are removed. As described below, in the illumination device 200, the cover member 10 having light transmission is disposed at a position facing the driver, and the light guiding member 20 and the base member 40, which will be described later, are disposed on the front direction side of the cover member 10. FIG. 2 schematically shows the steering wheel 100 in the state in which the cover member 10, the light guiding member 20, and the base member 40 are removed.

As shown in FIG. 2, when the cover member 10, the light guiding member 20, and the base member 40 are removed, a light emitting portion 30, which is one of components constituting the illumination device 200, is exposed. The light emitting portion 30 includes a substrate 31 and a plurality of light emitting elements provided on a surface of the substrate 31. In the present embodiment, the "plurality of light emitting elements" include a plurality of first LEDs 32 and a plurality of second LEDs 33. The substrate 31 has an arc-like and belt-like external shape that is curved along a circumferential direction of the grip portion 110 (hereinafter, also simply referred to as the "circumferential direction") when viewed by the driver. Hereinafter, a radial direction (a direction orthogonal to the axis AX) of the grip portion 110 is also simply referred to as the "radial direction". The plurality of first LEDs 32 are disposed at positions close to an end portion on the downward direction side of the surface of the substrate 31 on the rear direction side so as to be separated from each other by a predetermined distance along the circumferential direction. The first LEDs 32 emit the visible light. In the present embodiment, a visible light LED capable of emitting red light, green light, and blue light is used as the first LED 32. The plurality of second LEDs 33 form two groups g1 and g2 disposed to be separated from each other. Each of the groups g1 and g2 includes a plurality of second LEDs 33 adjacent to each other in the circumferential direction. Each of the two groups g1 and g2 is disposed at a position close to an end portion on the upward direction side of the surface of the substrate 31 on the rear direction side. The two groups g1 and g2 are disposed to be separated from each other so as to sandwich the plurality of first LEDs 32 when viewed along the circumferential direction.

Figure 3:
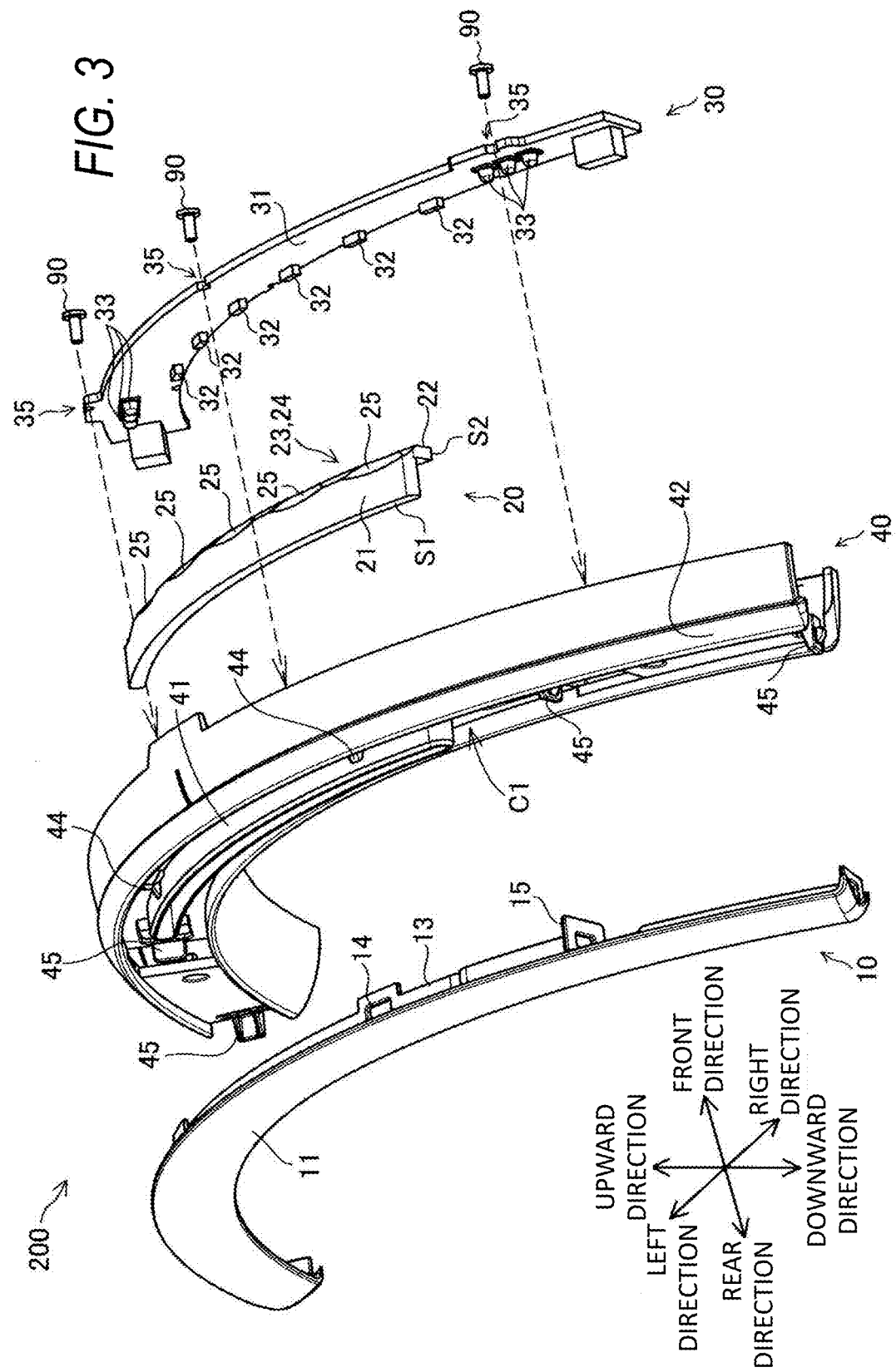
FIG. 3 is a first exploded perspective view showing a detailed configuration of the illumination device.
Figure 4:
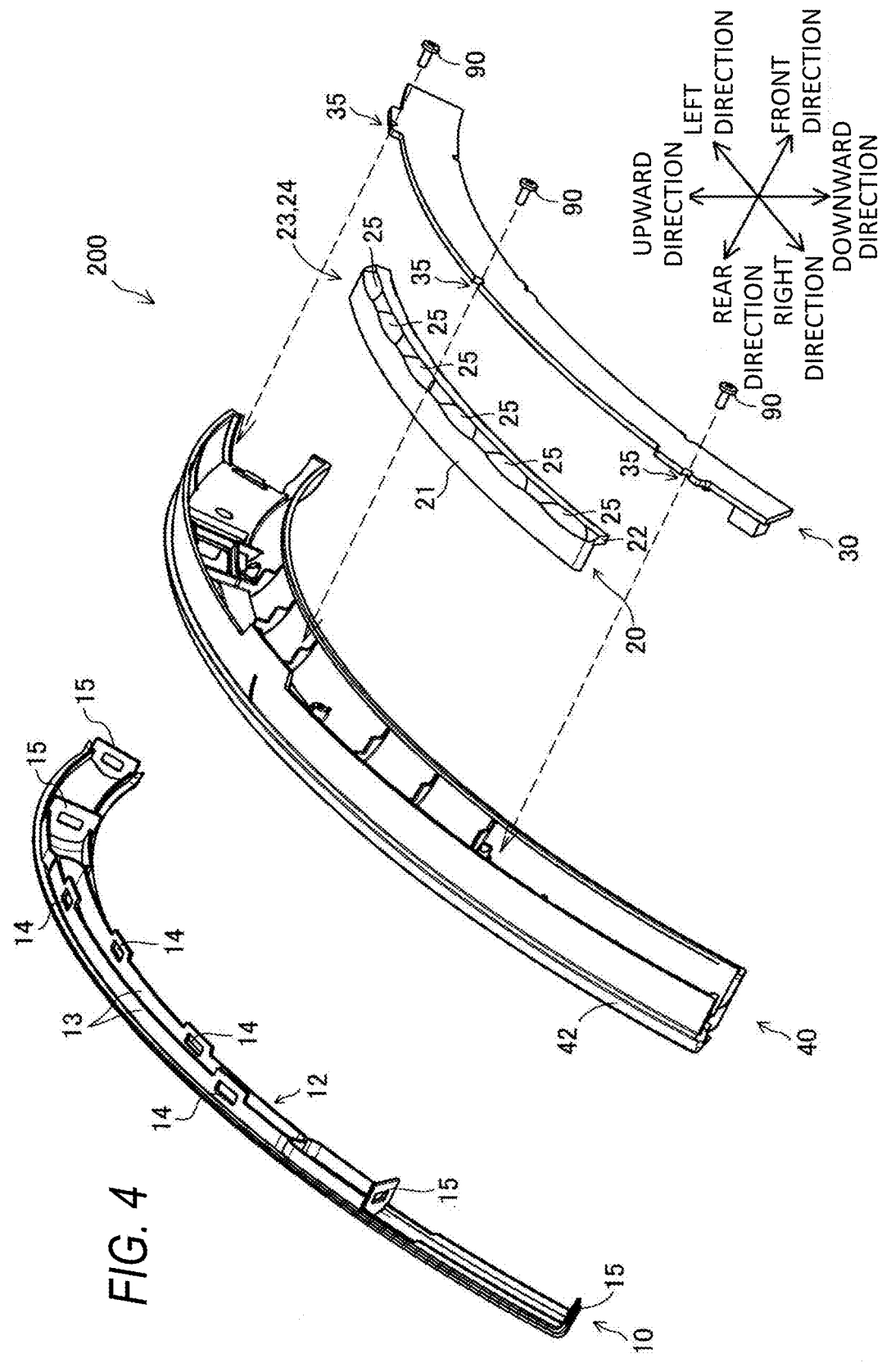
FIG. 4 is a second exploded perspective view showing the detailed configuration of the illumination device.
Figure 5:
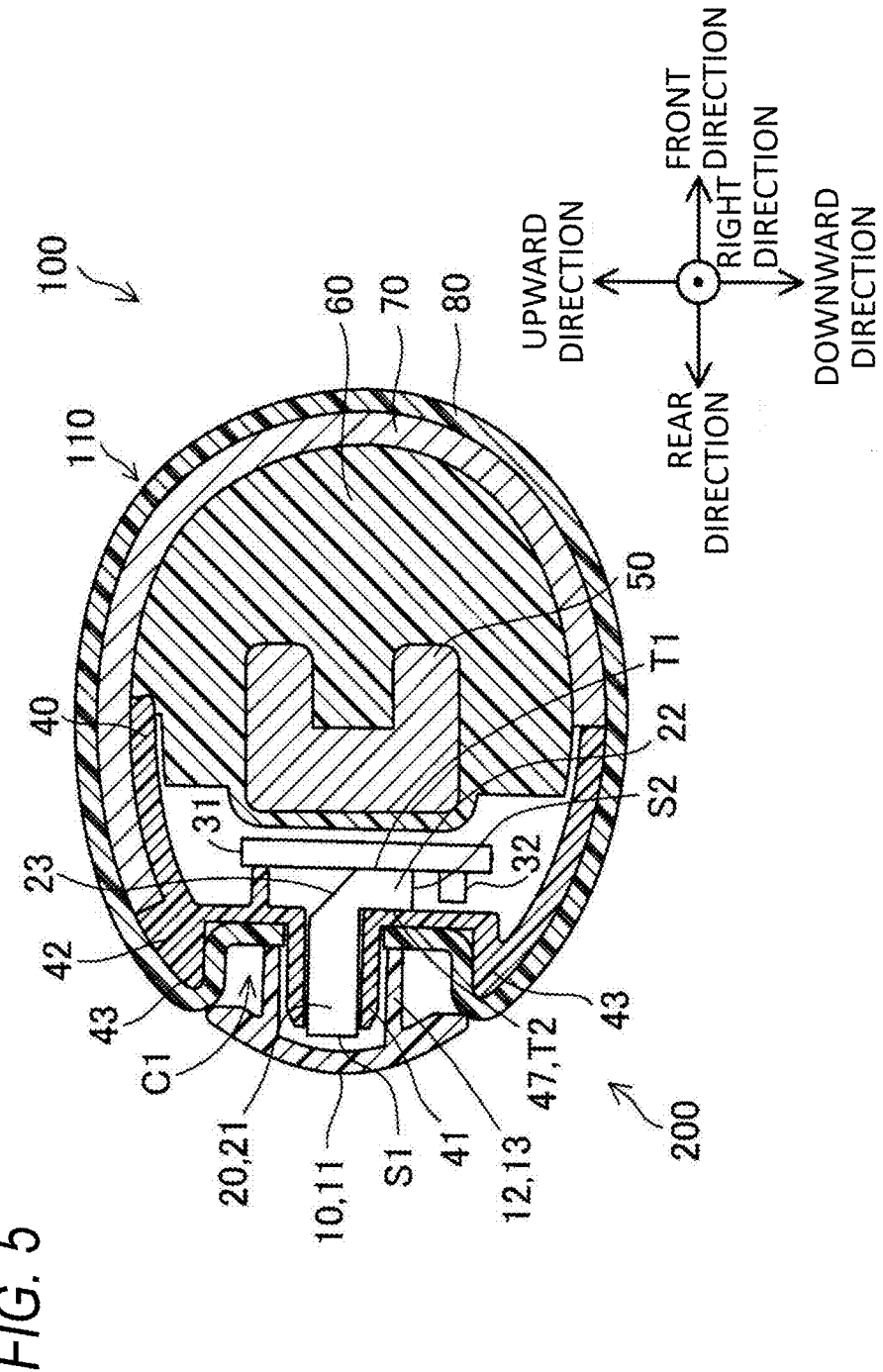
FIG. 5 is a first sectional view showing a cross section of the steering wheel.
Figure 6:
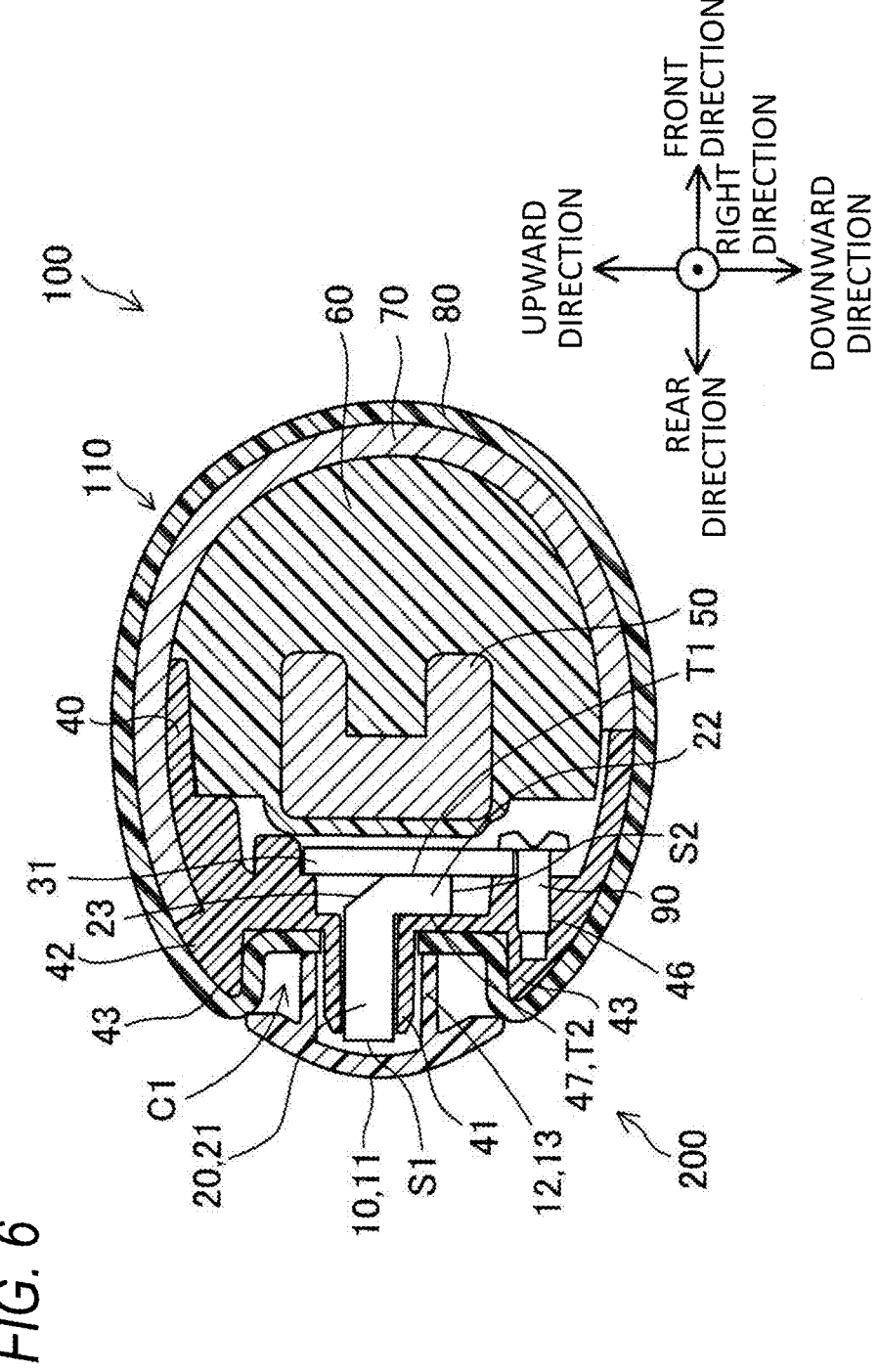
FIG. 6 is a second sectional view showing a cross section of the steering wheel.

A2. Detailed Configuration of Illumination Device 200:

FIG. 3 is a first exploded perspective view showing a detailed configuration of the illumination device 200. FIG. 4 is a second exploded perspective view showing the detailed configuration of the illumination device 200. FIG. 5 is a first sectional view showing a cross section of the steering wheel 100. FIG. 6 is a second sectional view showing a cross section of the steering wheel 100. FIG. 3 corresponds to an exploded perspective view of the illumination device 200 viewed substantially from the rear side toward the front side. FIG. 4 corresponds to an exploded perspective view of the illumination device 200 viewed substantially from the front side toward the rear side. FIG. 5 shows a cross section taken along a line V-V shown in FIG. 2. FIG. 6 shows a cross section taken along a line VI-VI shown in FIG. 2.

As shown in FIGS. 3 and 4, the illumination device 200 includes the cover member 10, the light guiding member 20, and the base member 40 in addition to the light emitting portion 30 described above. The illumination device 200 has a structure in which the light guiding member 20 and the light emitting portion 30, and the cover member 10 are integrally assembled in the front-rear direction with the base member 40 sandwiched therebetween.

As shown in FIGS. 3 and 4, the cover member 10 includes an outer surface forming portion 11, a surrounding portion 12, and a plurality of engaging walls 15. The outer surface forming portion 11 shown in FIG. 3 forms an outer surface of the steering wheel 100 continuously with the outer skin layer 80 as shown in FIGS. 5 and 6. Similarly to the substrate 31 described above, the outer surface forming portion 11 has an arc-like and belt-like external shape that is curved along the circumferential direction of the grip portion 110 when viewed by the driver. The outer surface forming portion 11 is transparent to the visible light and the infrared light. In the present embodiment, the outer surface forming portion 11 has a transmittance of about 25% with respect to the visible light and a transmittance of about 90% with respect to the infrared light. Each of the transmittances with respect to the visible light and the infrared light may be any value higher than 0%. In the present embodiment, the outer surface forming portion 11 is made of a black transparent synthetic resin in accordance with the black outer skin layer 80. The outer surface forming portion 11 has, in addition to a function of protecting the light emitting portion 30, a function of limiting a region through which the visible light emitted from the first LEDs 32 is transmitted (in other words, a function of masking a region which is not desired to be illuminated), and a function of deflecting an emission direction of the infrared light emitted from the second LEDs 33 to be directed to the upper side on the rear direction side which is a driver side. Further, the outer surface forming portion 11 may have a function of diffusing the visible light emitted from the first LEDs 32.

As shown in FIG. 4, the surrounding portion 12 is provided on a surface (an inner surface) of the outer surface forming portion 11 on the front direction side. In a state in which the illumination device 200 is assembled (hereinafter, also simply referred to as an "assembled state"), the surrounding portion 12 is disposed to surround a support portion 41 protruding from the recess C1 of the base member 40 shown in FIGS. 3, 5, and 6 toward the rear direction side, and a first light guiding portion 21 (to be described later) corresponding to a part of the light guiding member 20 accommodated in the support portion 41 over the entire periphery. The recess C1 has a groove-shaped structure that opens into a surface of the base member 40 in the front direction and extends along the circumferential direction. In the surrounding portion 12, a protrusion 13 corresponding to a side wall along the radial direction protrudes from the surface of the outer surface forming portion 11 on the front direction side, that is, the inner surface to a depth direction of the recess C1. In the present embodiment, the "depth direction of the recess C1" substantially coincides with the front-rear direction as evident from FIGS. 3, 5, and 6. As shown in FIG. 4, a plurality of engaging holes 14 are formed in the protrusion 13. In the assembled state, engaging claws 44 (see FIG. 3) provided in an outer peripheral surface of the support portion 41 of the base member 40 are engaged with the engaging holes 14. Such engagement is achieved as a so-called snap-fit. As shown in FIG. 4, each of the plurality of engaging walls 15 has a thin wall-like external shape protruding in the front direction, and is provided with an engaging hole. In the assembled state, the engaging walls 15 are disposed in contact with engaging walls 45 (see FIG. 3) of the base member 40. Further, in the assembled state, engaging claws provided in the engaging walls 45 are engaged with the engaging holes of the engaging walls 15. Such engagement is also achieved as the so-called snap-fit.

The light guiding member 20 guides the light (the visible light) emitted from the first LEDs 32 to the cover member 10. In the present embodiment, the light guiding member 20 is made of a polycarbonate (PC) resin. The light guiding member 20 may be made of an acrylic resin instead of the PC resin. As shown in FIGS. 3 to 6, the light guiding member 20 has an external shape whose cross-sectional shape along the axis AX is a substantially L shape. In addition, the light guiding member 20 has an arc-like external shape in accordance with disposed positions of the plurality of first LEDs 32 when viewed by the driver.

As shown in FIGS. 3 to 6, the light guiding member 20 includes the first light guiding portion 21, a second light guiding portion 22, and a deflection portion 23. The first light guiding portion 21 includes an emission surface S1 through which the visible light is emitted from the light guiding member 20 to the cover member 10. The first light guiding portion 21 extends along a direction (hereinafter, also referred to as a "first direction") from the surface of the substrate 31 toward the cover member 10. The first direction is parallel to the front direction. The second light guiding portion 22 has an incident surface S2 on which the visible light output from the first LEDs 32 is incident. As shown in FIG. 5, the incident surface S2 is located above the first LEDs 32. Therefore, the visible light is incident on the incident surface S2 upward from the first LEDs 32. The second light guiding portion 22 extends along a direction (hereinafter, also referred to as a "second direction") intersecting the first direction. The second direction corresponds to an upward direction and a substantially upward direction in the states of FIGS. 5 and 6. In the present embodiment, the first direction and the second direction are orthogonal to each other. The deflection portion 23 connects the first light guiding portion 21 and the second light guiding portion 22, reflects the visible light derived from the second light guiding portion 22, and inputs the visible light to the first light guiding portion 21. More specifically, the deflection portion 23 deflects the visible light, which is incident on the second light guiding portion 22 from the incident surface S2 and travels upward, forward and inputs the deflected visible light to the first light guiding portion 21. As shown in FIG. 4, the deflection portion 23 has a deflection surface 24 that deflects the visible light. A plurality of diffusion portions 25 are formed on the deflection surface 24. The diffusion portions 25 are disposed at positions corresponding to the first LEDs 32 on the front side. Each diffusion portion 25 has a recessed structure obtained by partially chamfering the deflection surface 24. Specifically, each diffusion portion 25 has a recessed structure in which a position corresponding to the first LED 32 in the front direction is most recessed and the depth gradually decreases toward positions corresponding to the adjacent first LEDs 32 along the circumferential direction. In addition, the width, that is, the dimension in the upward-downward direction of each diffusion portion 25 is largest at a position corresponding to the first LED 32 in the upward direction (more accurately, a direction toward the outside in the radial direction), and gradually decreases toward positions corresponding to the adjacent first LEDs 32 along the circumferential direction. By the deflection portion 23 having such a structure, the visible light of a so-called point light source output from the first LEDs 32 is diffused in the circumferential direction and the upward-downward direction when the visible light is deflected at the deflection portion 23. As shown in FIGS. 5 and 6, in the assembled state, the first light guiding portion 21 is accommodated in the recess C1. On the other hand, in the assembled state, the second light guiding portion 22 and the deflection portion 23 are located on the front direction side of the base member 40, and are not accommodated in the recess C1.

The base member 40 holds the light guiding member 20 and the light emitting portion 30 attached to the front direction side thereof, and holds the cover member 10 attached to the rear direction side thereof. Details of an attachment state of the base member 40, the light guiding member 20, and the light emitting portion 30 (the substrate 31) will be described later. As shown in FIGS. 3 and 4, the base member 40 has an arc-like and belt-like external shape that is curved along the circumferential direction when viewed by the driver. In the present embodiment, the base member 40 is configured as a single component made of an ABS resin. The base member 40 may be configured as a single component made of a PC resin instead of the ABS resin or in addition to the ABS resin. Alternatively, the base member 40 may be configured as a composite component obtained by combining a plurality of components. As described above, the recess C1 continuous in the circumferential direction is formed in a surface of the base member 40 on the rear direction side. As shown in FIGS. 3 to 6, on the surface of the base member 40 on the front direction side, a covering portion 42 continuous in the circumferential direction is provided on the upward direction side and the downward direction side with the recess C1 sandwiched therebetween. As shown in FIGS. 5 and 6, a cross-sectional shape of an outer surface of the covering portion 42 is a shape in which an angle between a surface existing in the upward direction and a surface existing in the downward direction with a top portion 43 sandwiched therebetween is an acute angle. The covering portion 42 is covered with the outer skin layer 80 to be described later.

In the recess C1, a through hole penetrating in the thickness direction is formed in a portion corresponding to the light guiding member 20. As shown in FIGS. 5 and 6, the first light guiding portion 21 of the light guiding member 20 is inserted into the through hole. As shown in FIGS. 3, 5, and 6, in the recess C1, the above support portion 41 is provided to surround the through hole into which the first light guiding portion 21 is inserted. Similarly to the surrounding portion 12 of the cover member 10 shown in FIG. 4, the support portion 41 is formed to protrude in the front direction so as to surround the through hole and a side surface of the first light guiding portion 21 inserted into the through hole over the entire periphery. As shown in FIG. 3, the support portion 41 has a flat cylindrical external shape curved to an arc shape. As described above, the plurality of engaging claws 44 are provided in the outer peripheral surface of the support portion 41, and the engaging claws 44 are engaged with the engaging holes 14 of the cover member 10 in the assembled state. The support portion 41 restrains a positional misalignment of the light guiding member 20 including the first light guiding portion 21 in the upward-downward direction and the left-right direction.

A3. Detailed Configuration of Grip Portion 110:

In the grip portion 110, a cross-sectional configuration of a portion other than the portion to which the illumination device 200 is attached is different from the cross-sectional configurations of the portion to which the illumination device 200 is attached shown in FIGS. 5 and 6 in that the illumination device 200 is not attached, and is the same in other points.

As shown in FIGS. 5 and 6, the grip portion 110 includes a cored bar 50, a core portion 60, an element layer 70, the above illumination device 200, and the outer skin layer 80.

The cored bar 50 is made of metal and is a member serving as a framework of the grip portion 110. In the present embodiment, the cored bar 50 is made of an aluminum alloy. The cored bar 50 may be made of any kind of metal such as a magnesium alloy and steel instead of the aluminum alloy. The core portion 60 is disposed to cover the entire cored bar 50, and forms a core of the grip portion 110. The core portion 60 is made of a soft synthetic resin having a cushioning property. Specifically, in the present embodiment, the core portion 60 is made of a soft foamed material such as foamed polyurethane. The element layer 70 partially covers the core portion 60. The element layer 70 is a layer provided with an electric heating wire constituting the heater and an electrode for detecting the gripping. For example, the element layer 70 is made of a conductive cloth obtained by performing a surface treatment such as carbon coating and metal plating to a fiber cloth. As shown in FIGS. 5 and 6, the element layer 70 also covers a part of the base member 40 at the portion of the grip portion 110 to which the illumination device 200 is attached. An outer surface of the element layer 70 and a part of an outer surface of the base member 40 form a continuous curved surface. The outer skin layer 80 continuously covers the outer surface of the element layer 70, the outer surface of the covering portion 42 of the base member 40, and the inside of the recess C1 of the base member 40. As shown in FIGS. 5 and 6, terminal portions of the leather member constituting the outer skin layer 80 are accommodated in the recess C1. The outer skin layer 80 is formed of the leather member. In the present embodiment, the leather member is made of natural leather such as a top leather and a split leather divided from the top leather. The leather member may be made of any kind of leather material such as synthetic leather and artificial leather instead of the natural leather.

A4. Manufacturing Method of Steering Wheel 100

A manufacturing method (an assembling method) of the steering wheel 100 having the above configuration will be described. First, a member obtained by removing the cover member 10 from the illumination device 200 (hereinafter, referred to as an "illumination subassembly") is manufactured. Specifically, first, the cover member 10, the light guiding member 20, the light emitting portion 30, and the base member 40 are manufactured. Then, the light guiding member 20 and the light emitting portion 30 are attached to a back surface (the front side in the assembled state) of the base member 40. At this time, three screws 90 shown in FIGS. 3 and 4 are screwed into screw holes 46 (see FIG. 6) provided in the base member 40 while being accommodated in cutout portions 35 provided in an upper edge portion of the substrate 31. In this way, the illumination subassembly is completed. Next, the cored bar 50 is formed. The core portion 60 and the element layer 70 are formed to surround the cored bar 50. Hereinafter, the member obtained in this manner is referred to as a "wheel element". The formation of the wheel element may be achieved by, for example, two-color molding. Subsequently, the illumination subassembly is fastened to the cored bar 50 by using screws. Accordingly, the wheel element and the illumination subassembly are integrated. In FIGS. 5 and 6, the cross sections of portions without fastening screws are shown. Since the illumination subassembly and the cored bar 50 are fastened to each other by the screws in this manner, heat generated with the light emission of the light emitting portion 30 can be transmitted to the cored bar 50, and an excessive increase in the temperature of the illumination device 200 can be restrained. Subsequently, the leather member is wound around an outer surface of the member obtained by integrating the wheel element and the illumination subassembly to form the outer skin layer 80. The outer skin layer 80 may be formed by, for example, winding a plurality of parts of the leather member in the circumferential direction. Subsequently, an adhesive is applied to a wall surface of the recess C1, the terminal portions of the outer skin layer 80 are bent along the shape of the covering portion 42 and are accommodated in the recess C1, and the terminal portions are adhered to the wall surface of the recess C1. Subsequently, the cover member 10 is fitted into the recess C1, and the cover member 10 is attached to the base member 40 by the snap-fit. In addition to the above procedure, there are procedures such as a procedure of accommodating the air bag and the inflator (not shown) in the boss portion 130, and descriptions of these procedures are omitted.

A5. Details of Attachment State of Base Member 40, Light Guiding Member 20, and Light Emitting Portion 30 (Substrate 31):

As shown in FIGS. 5 and 6, the light guiding member 20 is held by being sandwiched between the substrate 31 and the base member 40. Specifically, a surface of the second light guiding portion 22 in the light guiding member 20 on the rear direction side is in contact with a bottom forming portion 47 in the base member 40, which corresponds to the bottom of the recess C1. Further, a surface of the second light guiding portion 22 on the front direction side is in contact with the substrate 31. As described above, since the light guiding member 20 is held by being sandwiched between the substrate 31 and the base member 40, it is possible to restrain a deviation of a relative positional relation between the light guiding member 20 and the first LEDs 32 serving as light sources provided on the surface of the substrate 31. Here, a portion T1 (hereinafter, referred to as a "first contact portion T1") that comes into contact with the light guiding member 20 (the second light guiding portion 22) to sandwich the light guiding member 20 in the substrate 31 and a portion T2 (hereinafter, referred to as a "second contact portion T2") that comes into contact with the light guiding member 20 (the second light guiding portion 22) to sandwich the light guiding member 20 in the base member 40 are disposed at positions overlapping each other when viewed in a direction from the surface of the substrate 31 on which the first LEDs 32 are provided toward the cover member 10, that is, in the front direction. As shown in FIG. 5, the first LEDs 32 are not in contact with the bottom forming portion 47, and damage to the first LEDs 32 due to contact with the bottom forming portion 47 is restrained.

As shown in FIG. 6, as described above, the substrate 31 is attached to the base member 40 by screwing the screws 90 into the screw holes 46 of the base member 40 with the substrate 31 sandwiched therebetween, that is, by screwing. Then, the light guiding member 20 is held by the substrate 31 and the base member 40 by the screwing. Therefore, the holding of the light guiding member 20 by the substrate 31 and the base member 40 can be more reliably achieved, and such a holding state can be maintained for a longer time.

According to the illumination device 200 of the first embodiment described above, since the light guiding member 20 is held by being sandwiched between the substrate 31 and the base member 40, it is possible to restrain the deviation of the relative positional relation between the light guiding member 20 and the first LEDs 32 serving as the light sources provided on the surface of the substrate 31. In addition, since the deviation of the relative positional relation between the first LEDs 32 and the light guiding member 20 can be restrained as described above, for example, it is not necessary to prevent positional misalignment by providing an engaging portion such as a claw or an engaging hole on an outer peripheral surface of the light guiding member 20 and engaging the engaging portion with the base member 40 or the cover member 10. Therefore, it is possible to restrain a decrease in the amount of light due to, for example, leakage of the visible light to the outside in the engaging portion provided in the light guiding member 20.

Further, since the light guiding member 20 is held by the substrate 31 and the base member 40 by the screwing, as compared with a configuration without the screwing, the holding of the light guiding member 20 by the substrate 31 and the base member 40 can be more reliably achieved, and such a holding state can be maintained for a longer time.

Since the light guiding member 20 includes the first light guiding portion 21, the second light guiding portion 22, and the deflection portion 23, as compared with a configuration including only the first light guiding portion 21 or only the second light guiding portion 22, a light path length of the light guiding member 20 can be increased, and thus the light can be more easily diffused. In addition, as compared with a configuration in which the second light guiding portion 22 is omitted and the length of the first light guiding portion 21 is extended or a configuration in which the first light guiding portion 21 is omitted and the length of the second light guiding portion 22 is extended, an excessive increase in the length of the light guiding member 20 in a specific direction can be restrained, and the size of the illumination device 200 can be reduced.

Since the base member 40 includes the support portion 41 that surrounds the side surface of the first light guiding portion 21 over the entire periphery, an excessive positional misalignment of the first light guiding portion 21 can be restrained.

In addition, since the first contact portion T1 and the second contact portion T2 are disposed at the positions overlapping each other when viewed in the direction from the surface of the substrate 31 toward the cover member 10, a positional misalignment of the substrate 31 in the direction from the surface of the substrate 31 toward the cover member 10 can be more reliably restrained. Therefore, deviation of the relative positional relation between the first LEDs 32 as the light sources and the light guiding member 20 can be more reliably restrained.

B. Second Embodiment

Figure 7:
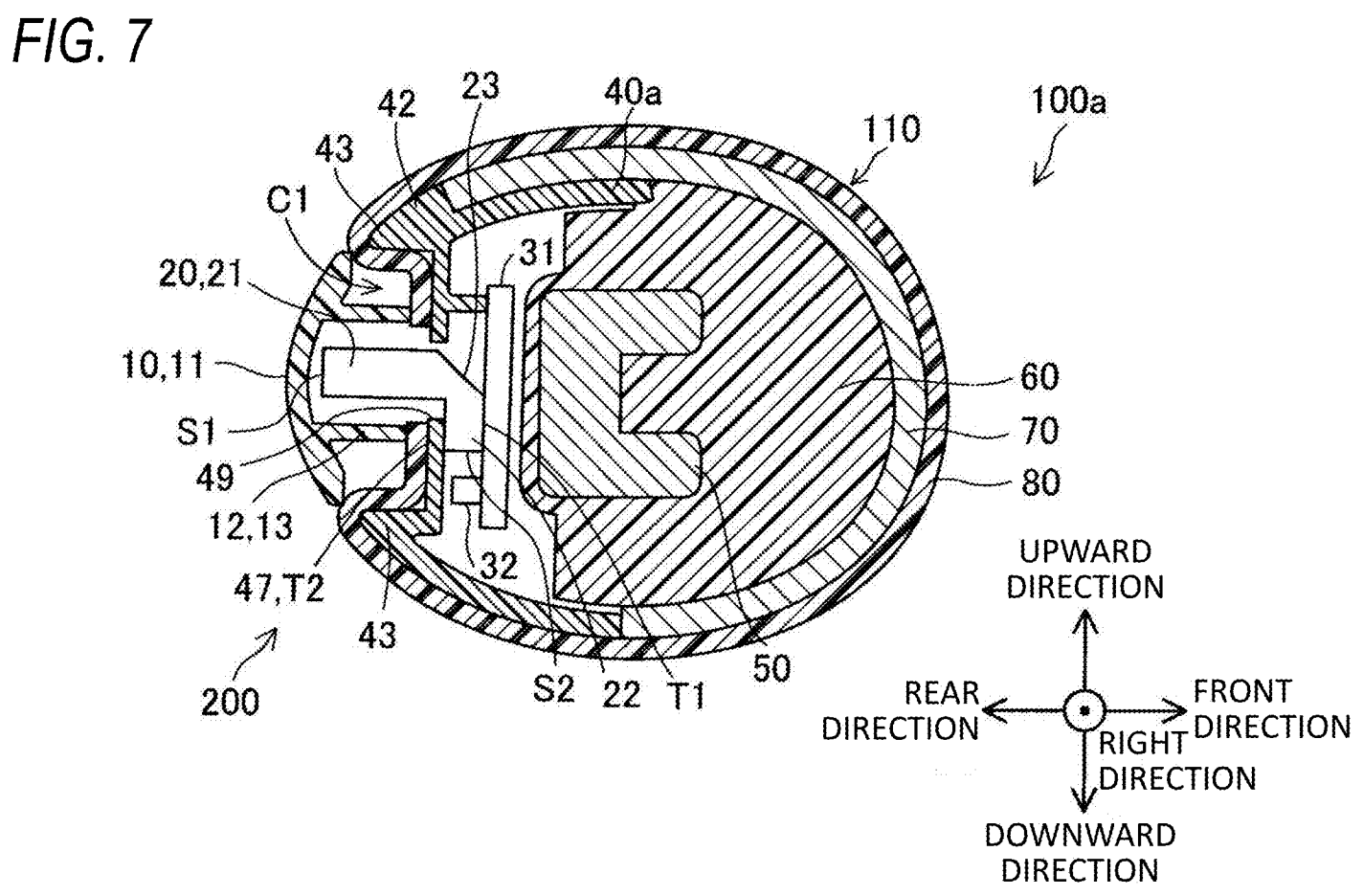

FIG. 7 is a sectional view showing a cross section of a steering wheel 100a according to a second embodiment.

Similarly to FIG. 5, FIG. 7 shows a cross section at the same position as the cross section taken along the line V-V shown in FIG. 2. The steering wheel 100a according to the second embodiment is different from the steering wheel 100 according to the first embodiment in that a base member 40a is used instead of the base member 40. Other components of the steering wheel 100a according to the second embodiment are the same as those of the steering wheel 100 according to the first embodiment, and thus the same components are denoted by the same reference numerals, and detailed description thereof is omitted.

The base member 40a according to the second embodiment is different from the base member 40 according to the first embodiment in that the support portion 41 is not included, and other components are the same.

The illumination device 200 according to the second embodiment having the above configuration achieves the same effects as those of the illumination device 200 according to the first embodiment. For example, as shown in FIG. 7, as a result of omitting the support portion 41, in the base member 40a, a through hole forming portion 49 forming the through hole into which the first light guiding portion 21 is inserted is exposed. Since the through hole forming portion 49 is present in the vicinity of the first light guiding portion 21, the positional misalignment of the first light guiding portion 21 is further restrained by the through hole forming portion 49.

C. Third Embodiment

Figure 8:
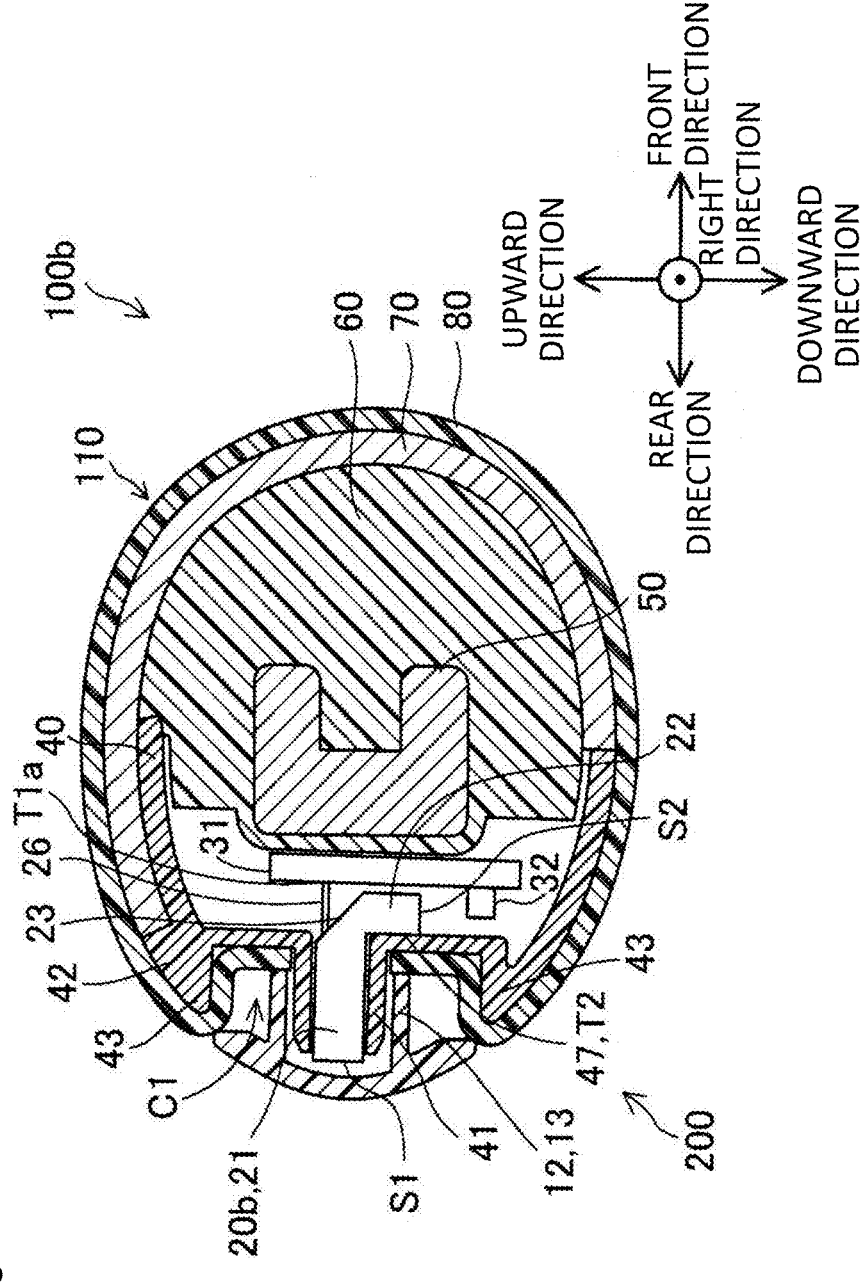
FIG. 8 is a sectional view showing a cross section of a steering wheel according to a third embodiment.

FIG. 8 is a sectional view showing a cross section of a steering wheel 100b according to a third embodiment. Similarly to FIG. 5, FIG. 8 shows a cross section at the same position as the cross section taken along the line V-V shown in FIG. 2. The steering wheel 100b according to the third embodiment is different from the steering wheel 100 according to the first embodiment in that a light guiding member 20b is used instead of the light guiding member 20 and that a first contact portion T1a is provided instead of the first contact portion T1. Other components of the steering wheel 100b according to the third embodiment are the same as those of the steering wheel 100 according to the first embodiment, and thus the same components are denoted by the same reference numerals, and detailed description thereof is omitted.

Figure 9:
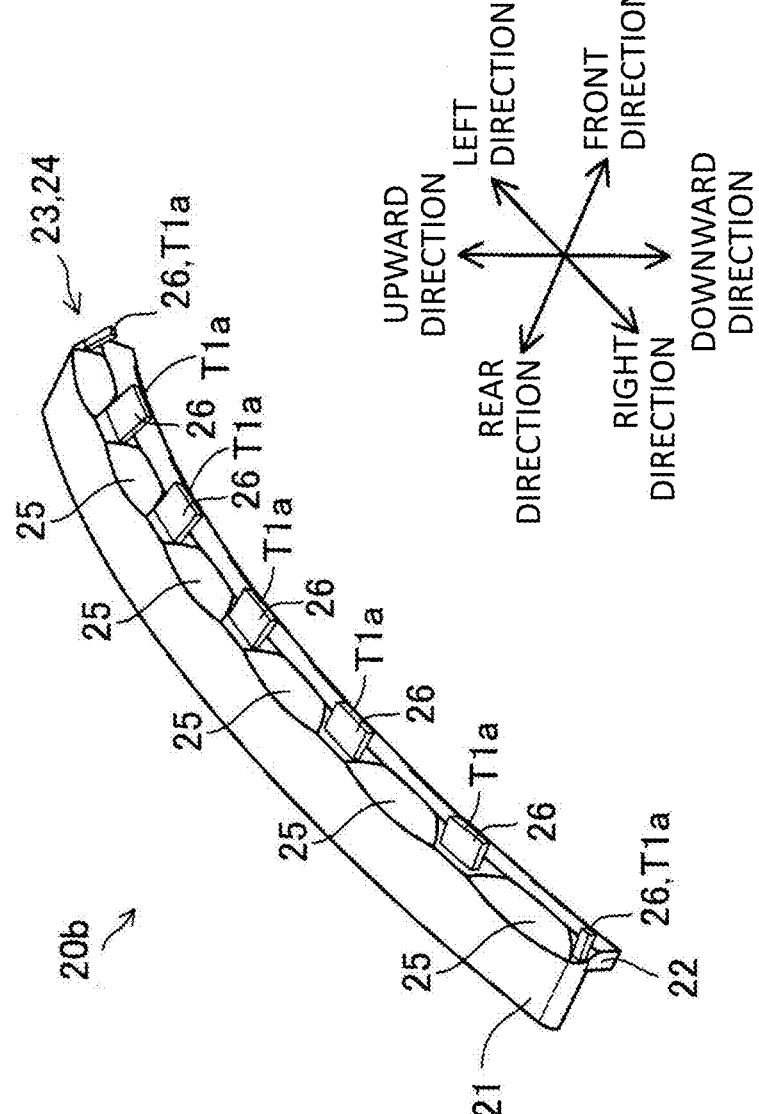
FIG. 9 is a perspective view showing a detailed configuration of a light guiding member according to the third embodiment.

FIG. 9 is a perspective view showing a detailed configuration of the light guiding member 20b according to the third embodiment. The light guiding member 20b according to the third embodiment is different from the light guiding member 20 according to the first embodiment in that a plurality of post portions 26 are provided, and other components are the same. Each post portion 26 has a thin plate-like external shape, and is disposed between two diffusion portions 25 adjacent to each other along the circumferential direction.

As shown in FIG. 8, a front end of each post portion 26 is located in front of a front end of the light guiding member 20 (the second light guiding portion 22). As a result, the substrate 31 is not in contact with the second light guiding portion 22 but is in contact with the ends of the post portions 26. Therefore, in the third embodiment, the first contact portion T1a, which is a portion that comes into contact with the light guiding member 20 to sandwich the light guiding member 20 in the substrate 31, is a portion that comes into contact with the tip of the post portion 26. Accordingly, in the third embodiment, the first contact portion T1a and the second contact portion T2 are not disposed at positions overlapping each other when viewed in the direction from the surface of the substrate 31 toward the cover member 10.

The illumination device 200 according to the third embodiment having the above configuration achieves the same effects as those of the illumination device 200 according to the first embodiment.

D. Fourth Embodiment

FIG. 10 is a sectional view showing a cross section of a steering wheel 100c according to a fourth embodiment. Similarly to FIG. 5, FIG. 10 shows a cross section at the same position as the cross section taken along the line V-V shown in FIG. 2. In the steering wheel 100c according to the fourth embodiment, the disposed positions of the first LEDs 32 on the substrate 31 are different from the disposed positions in the steering wheel 100 according to the first embodiment. Specifically, in the fourth embodiment, the first LEDs 32 are further disposed upward on the substrate 31 compared to those in the first embodiment. In the steering wheel 100c according to the fourth embodiment, the first LEDs 32 are different from the first LEDs 32 according to the first embodiment in that the first LEDs 32 emit the visible light forward. Further, the steering wheel 100c according to the fourth embodiment is different from the steering wheel 100 according to the first embodiment in that a light guiding member 20c is used instead of the light guiding member 20. Other components of the steering wheel 100c according to the fourth embodiment are the same as those of the steering wheel 100 according to the first embodiment, and thus the same components are denoted by the same reference numerals, and detailed description thereof is omitted.

The light guiding member 20c according to the fourth embodiment is different from the light guiding member 20 according to the first embodiment in that a surrounding portion 27 is provided instead of the second light guiding portion 22 and the deflection portion 23, and other components are the same. As shown in FIG. 10, the surrounding portion 27 has a shape surrounding the first LEDs 32, and is disposed to surround the first LEDs 32. Specifically, the surrounding portion 27 is disposed to continuously surround the first LEDs 32 in the upward direction, the front direction, and the downward direction. In the fourth embodiment, the first LEDs 32 are disposed at positions corresponding to the rear direction of the first light guiding portion 21. Accordingly, the visible light emitted from the first LEDs 32 travels in the front direction, is incident on the first light guiding portion 21 from an incident surface S2c, is guided by the first light guiding portion 21, and is emitted from the emission surface S1 toward the cover member 10.

According to the fourth embodiment, in the substrate 31, a portion of the surrounding portion 27 that covers the substrate 31 from the upward direction and a portion thereof that covers the substrate 31 from the downward direction correspond to first contact portions T1b.

The illumination device 200 according to the fourth embodiment having the above configuration achieves the same effects as those of the illumination device 200 according to the first embodiment.

E. Other Embodiments (E1) In the embodiments, the substrate 31 is attached to the base member 40 or the base member 40a by the screwing, but the present disclosure is not limited thereto. For example, a configuration may be used in which the base member 40 or the base member 40a includes engaging claws, and the substrate 31 is attached by engaging the engaging claws with the substrate 31.

(E2) In the embodiments, the illumination device 200 is provided in the grip portion 110, but the present disclosure is not limited thereto. For example, a configuration may be used in which the illumination device 200 may be provided in any portion of the steering wheels 100 and 100a to 100c, such as the boss portion 130 and the spoke portions 120. In this case, the shape and the configuration of the illumination device 200 can be appropriately changed in accordance with the size, shape, and the like of a place in which the illumination device 200 is provided. The position of the illumination device 200 is preferably a position that can be viewed directly by the driver. However, for example, in a case in which the light emitted from the illumination device 200 is reflected on a surface of any portion in the vehicle, for example, a surface of an instrument panel, and the reflected light can be viewed by the driver, the position of the illumination device 200 may be a position that cannot be viewed directly by the driver.

(E3) The configurations of the steering wheels 100 and 100a to 100c of the embodiments are merely examples, and can be variously changed. For example, in the embodiments, the protrusion 13 may be omitted. Further, in the embodiments, the plurality of second LEDs 33 may be omitted. In addition, in the first to third embodiments, the cross-sectional shape along the axis AX of the light guiding member 20 is a substantially L shape. That is, the first direction and the second direction are orthogonal to each other. However, a configuration may be used in which the first light guiding portion 21 and the second light guiding portion 22 are disposed such that these directions intersect at any angle other than 90°.

The present disclosure is not limited to the above embodiments, and can be implemented by various configurations without departing from the gist of the present disclosure. For example, the technical features in each embodiment corresponding to the technical features in the aspects described in the summary of the invention can be replaced or combined appropriately in order to solve a part or all of the above problems or in order to achieve a part or all of the above effects. Further, unless the technical features are described as being essential in the present specification, the technical features can be appropriately deleted.

What is claimed is:

1. An illumination device to be provided in a steering wheel, comprising:
   a substrate provided with a light emitting element on a surface of the substrate;
   a cover member that forms a part of an outer surface of the steering wheel and has light transmission of emitting visible light output from the light emitting element to an outside of the steering wheel;
   a light guiding member configured to guide the visible light output from the light emitting element to the cover member; and
   a base member to which the substrate and the cover member are attached and which holds the substrate and the cover member,
   wherein the light guiding member is sandwiched between the substrate and the base member and held in direct contact in a front-rear direction with the substrate and the base member,
   wherein the substrate is attached to the base member by screwing a screw through the substrate into the base member, and the light guiding member is held by the substrate and the base member due to the screwing.

2. The illumination device according to claim 1, wherein the light guiding member includes:

a first light guiding portion having an emission surface through which the visible light is emitted from the light guiding member to the cover member, and configured to extend along a first direction from the surface of the substrate toward the cover member;

a second light guiding portion having an incident surface on which the visible light output from the light emitting element is incident, and configured to extend along a second direction intersecting the first direction; and a deflection portion connecting the first light guiding portion and the second light guiding portion, and configured to deflect the visible light derived from the second light guiding portion to be input to the first light guiding portion.

3. The illumination device according to claim 1, wherein the light guiding member includes a first light guiding portion having an emission surface through which the visible light is emitted from the light guiding member to the cover member, and configured to extend along a first direction from the surface of the substrate toward the cover member, and the base member includes a support portion surrounding at least a part of a side surface of the first light guiding portion over an entire periphery of the first light guiding portion.

4. The illumination device according to claim 1, wherein a first contact portion of the substrate and a second contact portion of the base member are disposed at positions overlapping each other as viewed in a direction from the surface of the substrate toward the cover member, the first contact portion coming into contact with the light guiding member to sandwich the light guiding member with the base member, and the second contact portion coming into contact with the light guiding member to sandwich the light guiding member with the substrate.

5. The illumination device according to claim 1, wherein the light guiding member includes a first light guiding portion that extends along a first direction from the surface of the substrate toward the cover member, and a second light guiding portion configured to extend in a second direction along the surface of the substrate, the second direction is angled to intersect the first direction, the second light guiding portion has a first side facing the substrate, and a second side opposite from the first side and facing the cover member;

wherein in a front-rear cross-sectional view of the steering wheel, the first side of the second light guiding portion and the surface of the substrate are in direct, flat, planar contact with each other, and the second side of the second light guiding portion and a surface of the base member parallel to the surface of the substrate are in direct, flat, planar contact with each other.

6. The illumination device according to claim 1, wherein the light guiding member has an L shape in a cross sectional view.

7. The illumination device according to claim 1, wherein the light guiding member has an arc shape as viewed from a front direction.

8. The illumination device according to claim 1, wherein the cover member and the base member are configured to be attached to each other by a snap-fit.

* * * * *